US010814341B2

(12) United States Patent
Brooks et al.

(10) Patent No.: US 10,814,341 B2
(45) Date of Patent: Oct. 27, 2020

(54) ARMREST CONTROL CENTER WITH SPRAY BOOM CONTROL

(71) Applicant: CNH Industrial America LLC, New Holland, PA (US)

(72) Inventors: Nathan P. Brooks, Manitowoc, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 358 days.

(21) Appl. No.: 15/805,603

(22) Filed: Nov. 7, 2017

(65) Prior Publication Data

US 2019/0134656 A1    May 9, 2019

(51) Int. Cl.
| | |
|---|---|
| *B05B 12/00* | (2018.01) |
| *B05B 12/12* | (2006.01) |
| *B05B 1/20* | (2006.01) |
| *B05B 13/00* | (2006.01) |
| *B05B 9/04* | (2006.01) |
| *B05B 12/14* | (2006.01) |
| *B05B 15/656* | (2018.01) |
| *B05B 15/55* | (2018.01) |
| *A01M 7/00* | (2006.01) |
| *A01C 23/04* | (2006.01) |
| *A01C 23/00* | (2006.01) |

(52) U.S. Cl.
CPC ......... *B05B 12/124* (2013.01); *A01M 7/0057* (2013.01); *B05B 1/20* (2013.01); *B05B 9/0403* (2013.01); *B05B 12/002* (2013.01); *B05B 12/14* (2013.01); *B05B 13/005* (2013.01); *B05B 15/55* (2018.02); *B05B 15/656* (2018.02); *A01C 23/008* (2013.01); *A01C 23/047* (2013.01)

(58) Field of Classification Search
CPC ..... B05B 12/124; B05B 15/55; B05B 15/656; B05B 1/20; B05B 9/0403; B05B 12/002
USPC .......................................................... 701/50
See application file for complete search history.

(56) References Cited

U.S. PATENT DOCUMENTS

| | | | |
|---|---|---|---|
| 5,884,205 A | 3/1999 | Elmore et al. | |
| 5,911,362 A | 6/1999 | Wood et al. | |
| 6,061,617 A | 5/2000 | Berger et al. | |
| 6,131,062 A | 10/2000 | Nielsen | |

(Continued)

OTHER PUBLICATIONS

WNIF; Full Isobus Control with S10 Terminal (http://www.wnif.co.uk/2016/11//class-full-isobus-control-with-s10-terminal/)—(6) pages.

(Continued)

*Primary Examiner* — Peter D Nolan
*Assistant Examiner* — Wae L Louie
(74) *Attorney, Agent, or Firm* — Rebecca L. Henkel; Rickard K. DeMille

(57) ABSTRACT

An armrest control center can be configured on with respect to an armrest of a chair in an operator cab of an agricultural machine to have physical inputs which can be quickly and easily controlled by an operator in the cab to affect automatically controlled sprayer boom functions so that the operator is not distracted by cumbersome menus on a computer screen. Such physical inputs can include push buttons and/or a joystick. Such sprayer boom functions can include activating or deactivating automatic sprayer boom height control, adjusting automatic sprayer boom height settings, and folding and/or unfolding the sprayer boom.

20 Claims, 5 Drawing Sheets

(56) References Cited

U.S. PATENT DOCUMENTS

| | | | |
|---|---|---|---|
| 8,186,136 B2 | 5/2012 | Eick et al. | |
| 8,191,795 B2 | 6/2012 | Grimm et al. | |
| 8,688,331 B2 | 4/2014 | Peterson et al. | |
| 9,707,882 B2* | 7/2017 | Ballu | A01M 7/0057 |
| 2011/0266365 A1* | 11/2011 | Hrnicek | A01C 23/008 |
| | | | 239/164 |
| 2012/0256843 A1 | 10/2012 | Epple et al. | |
| 2014/0048368 A1* | 2/2014 | Maagaard | F16F 15/02 |
| | | | 188/378 |
| 2015/0101440 A1* | 4/2015 | Bonneau | G05G 1/06 |
| | | | 74/484 R |
| 2015/0272106 A1* | 10/2015 | Schertz | B05B 12/008 |
| | | | 239/11 |
| 2016/0037708 A1* | 2/2016 | Johnson | A01B 69/004 |
| | | | 701/70 |
| 2016/0041803 A1 | 2/2016 | Markov et al. | |
| 2016/0232814 A1* | 8/2016 | Smith | G09B 5/02 |
| 2016/0309647 A1* | 10/2016 | Bittner | A01C 23/047 |
| 2016/0310978 A1 | 10/2016 | Bittner et al. | |
| 2016/0316616 A1* | 11/2016 | Brooks | A01C 23/007 |
| 2016/0318465 A1 | 11/2016 | Brooks | |
| 2016/0338335 A1 | 11/2016 | Hammer et al. | |
| 2017/0308074 A1* | 10/2017 | Kandula | E02F 9/2004 |
| 2018/0080193 A1* | 3/2018 | Myers | E02F 3/434 |
| 2018/0170274 A1* | 6/2018 | Gomez | B60R 11/02 |
| 2019/0059351 A1* | 2/2019 | Brooks | B62D 49/0678 |
| 2019/0105667 A1* | 4/2019 | Bharatiya | A01M 7/0057 |
| 2019/0134656 A1* | 5/2019 | Brooks | A01M 7/0057 |
| 2019/0152360 A1* | 5/2019 | Brooks | B60N 2/12 |
| 2019/0357520 A1* | 11/2019 | Redden | A01M 7/0042 |

OTHER PUBLICATIONS

NORAC Systems International Inc.; UC5 CABUS Spray Height Controller; John Deere GS2 2600 & 1800 JD 4630 Display Kit; (http://www.norac.ca/media/ca/en/manual/54VT-GS2-SP02-INSTa.pdf)—(11) pages.

* cited by examiner

ARMREST CONTROL CENTER WITH SPRAY BOOM CONTROL

FIELD OF THE INVENTION

The invention relates generally to agricultural product application equipment such as self-propelled sprayers and, in particular, to a spray boom control system in which a machine controller can receive a command from an armrest control center for affecting control with respect to a spray boom and route the command to a boom control module to affect such control

BACKGROUND OF THE INVENTION

High-clearance sprayers are getting larger and more complex to allow for increasing coverage in a single pass, which improves application efficiency. An important aspect of product application effectiveness is the relative distance between the field or plants and the sprayer boom, also known as "boom height." It can be important to deliver an agricultural product as close to the ground or plants as possible to ensure that the target receives the product. However, it is also important that the sprayer boom is spaced far enough from the field or plants to avoid any contact which could cause damage. In fact, boom height is so important that many efforts have been made to automate boom height control to allow an operator to concentrate on driving and other operations in the field while a control system maintains an appropriate boom height.

However, there are times when it is beneficial to deactivate the automatic boom height control, such as when applying the agricultural product at high speeds or when the sprayer boom is folded in a transport position. There are also other times when it is beneficial to adjust automatic boom height settings, like the target boom height for the automatic boom height control system. However, activating or deactivating the automatic boom height control and adjusting the automatic boom height settings typically requires navigating through multiple menus of a Virtual Terminal (VT) screen to make such changes. This can be cumbersome and distracting for the operator. What is needed is an improved system that eliminates one or more of the foregoing disadvantages.

SUMMARY OF THE INVENTION

An armrest control center can be configured on with respect to an armrest of a chair in an operator cab of an agricultural machine to have physical inputs which can be quickly and easily controlled by an operator in the cab to affect automatically controlled sprayer boom functions so that the operator is not distracted by cumbersome menus on a computer screen. Such physical inputs can include push buttons and/or a joystick. Such sprayer boom functions can include activating or deactivating automatic sprayer boom height control, adjusting automatic sprayer boom height settings, and folding and/or unfolding the sprayer boom.

In one aspect, an automatic boom height control module can be set up as a node on an International Organization for Standardization (ISO) or Controller Area Network (CAN) bus, instead of being solely accessible through a VT. By connecting the automatic boom height control module as a node on a bus, automatic boom height features can be controlled through, for example, buttons on an armrest control center. In this way, an operator does not have to navigate through menus on a VT for controlling the automatic boom height feature.

Specifically then, one aspect of the present invention can provide a spray boom control system for an agricultural machine, including: a boom control module configured to receive an input from a boom sensor indicating a relative distance between a spray boom and a field or plants below the spray boom and provide an output to an actuator controlling the relative distance according to a boom height set point when a boom height control is activated, the boom control module being connected to a data communications bus; an armrest control center including an instrument panel providing multiple physical inputs configured to receive commands from an operator of the agricultural machine, in which a first input of the inputs corresponds to activating or deactivating the boom height and a machine controller in communication with the boom control module through the data communications bus and the armrest control center, the machine controller having a processor executing a program stored in a non-transient medium to: receive a command from the first input for activating or deactivating the boom height control and route the command to the boom control module to activate or deactivate the boom height control, respectively.

Another aspect can provide a spray boom control system for an agricultural machine, including: a boom control module configured to receive an input from a boom sensor indicating a relative distance between a spray boom and a field or plants below spray boom and provide an output to an actuator controlling the relative distance according to a boom height set point, the boom control module being connected to a data communications bus; an armrest control center including an instrument panel providing multiple physical inputs configured to receive commands from an operator of the agricultural machine, in which a first input of the inputs corresponds to adjusting the relative distance; and a machine controller in communication with the boom control module through the data communications bus and the armrest control center, the machine controller having a processor executing a program stored in a non-transient medium to: receive a command from the first input for adjusting the relative distance by changing the boom height set point and route the command to the boom control module to change the boom height set point.

Another aspect can provide an agricultural sprayer including: a sprayer boom extending transversely relative to a chassis, the sprayer boom including multiple boom sensors for indicating a relative distance between a spray boom and a field or plants below spray boom and multiple actuators for controlling the relative distance according to a boom height set point when a boom height control is activated; an operator cab supported by the chassis, the operator cab including a chair physically connected to an armrest control center including an instrument panel providing multiple physical inputs configured to receive commands from an operator of the agricultural machine, in which a first input of the inputs corresponds to activating or deactivating the boom height control; a boom control module configured to receive inputs from the boom sensors and provide outputs to the actuators for controlling the relative distance according to the boom height set point when the boom height control is activated, the boom control module being connected to a data communications bus; and a machine controller in communication with the boom control module through the data communications bus and the armrest control center, the machine controller having a processor executing a program stored in a non-transient medium to: receive a command from the first input for activating or deactivating the boom height control and route the command to the boom control module to activate or deactivate the boom height control, respectively.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
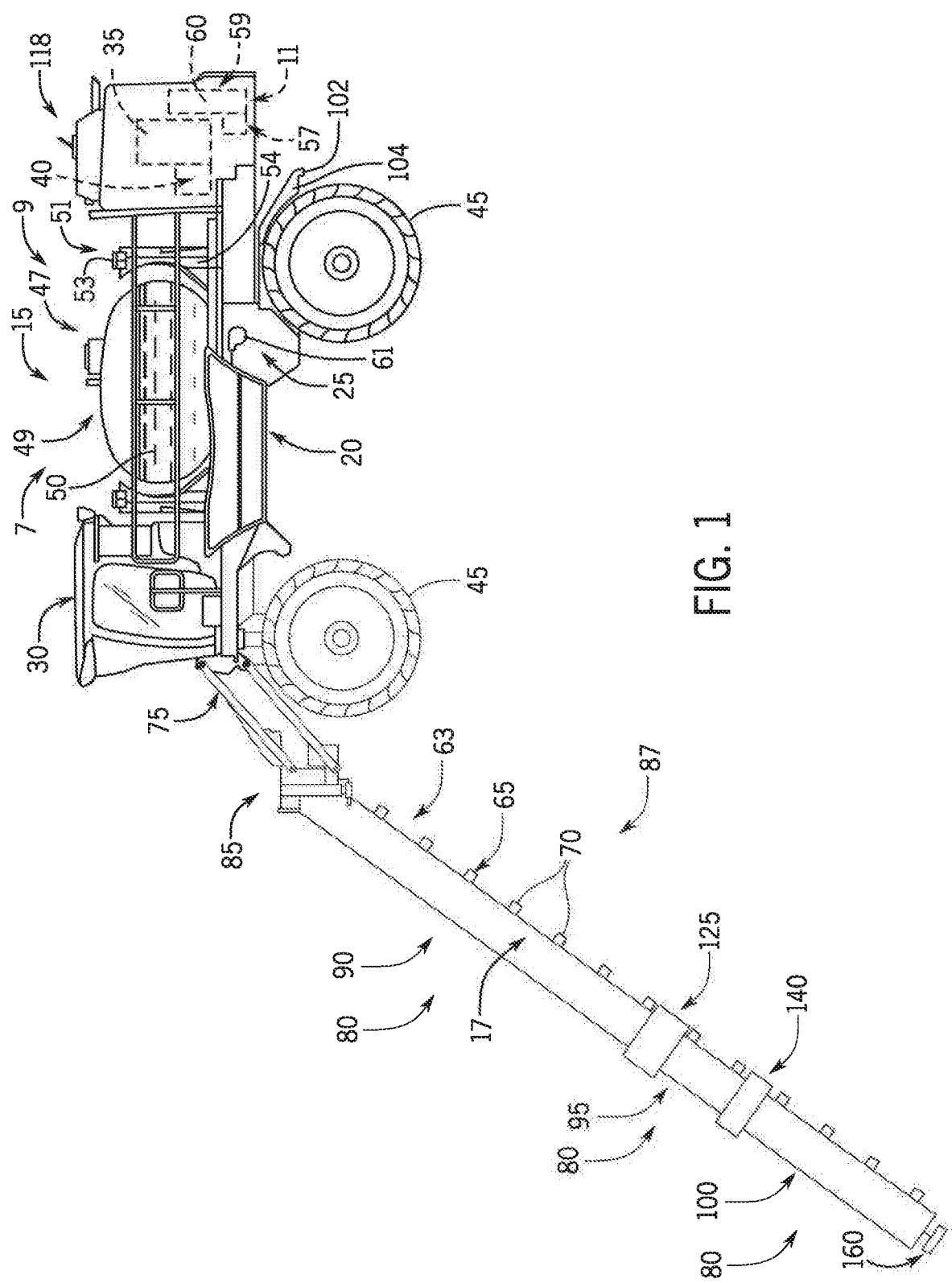
FIG. 1 is a side elevation of an exemplar agricultural machine according to the present invention.

Referring now to the drawings and specifically to FIG. 1, an agricultural machine is shown here as a self-propelled agricultural sprayer vehicle or self-propelled sprayer 15 having a spray boom 17, such as those available from CNH Industrial, including the Miller Nitro and Condor Series sprayers and New Holland Guardian Series sprayers. The sprayer 15 includes a chassis 20 having a chassis frame 25 that supports various assemblies, systems, and components. These various assemblies, systems, and components include a cab 30, an engine 35, and a hydraulic system 40. The hydraulic system 40 receives power from the engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from the engine 35 and delivers power for rotating the wheels 45 by way of power-transmitting driveline components such as drive shafts, differentials, and other gear sets in portal, drop boxes, or other housings. The sprayer 15 can also include a Global Positioning System (GPS) 118 for continuously determining a current location of the machine, such as for carrying out an agricultural treatment plan according to a prescription map.

Still referring to FIG. 1, a product system 7 can include a product storage system 47 with a product tank 49 storing an agricultural liquid product 50 on the chassis 20. Product 50 can include any of a variety of agricultural liquid products, such as various pesticides, herbicides, fungicides, liquid fertilizers, and other liquids including liquid suspensions beneficial for application onto agricultural fields by way of a spray boom 17. A rinse system 9 can include a rinse liquid storage system 51 having a rinse tank 53 storing a rinse liquid 54 such as water or another suitable rinse liquid. Also, an air purge system 11 can include a compressed air storage system having an air compressor 57 operably connected to an air tank 59 that stores air 60 compressed by a compressor 57. A flow system is configured to selectively direct liquid product 50, rinse liquid 54 and/or air 60 through various flow paths defined through the sprayer 15 and the boom 17 depending on whether a spraying procedure, a rinsing procedure, or a pneumatic purging or boom blow-out procedure is being performed. During spraying and rinsing procedures, the flow system can energize a pump 61 to convey either liquid product 50 or rinse liquid 54 to the boom 17.

In operation, the pump 61 can push either liquid product 50 or rinse liquid 54 through plumbing components such as interconnected pieces of tubing and through a boom flow system 63 that includes segments of boom tubing 65 for release out of spray boom nozzles 70 that are spaced from each another along the width of the boom 17 during spraying or rinsing operations of the sprayer 15 (according to activation/deactivation states which can be implemented, for example, using electronically controlled switches). Accordingly, such plumbing components can connect the product storage system 47, the rinse liquid storage system 51 and the boom 17 via an on-board valve system and boom valve system. During spraying procedures, groups of nozzles 70 defined in spray sections along the boom 17 can selectively deliver product 50 for release onto an agricultural field at locations corresponding to positions of activated spray sections. The boom 17 is connected to the chassis 20 with a lift arm assembly 75 that is configured to move the boom 17 up and down for adjusting the height of application of the product 50.

Figure 2:
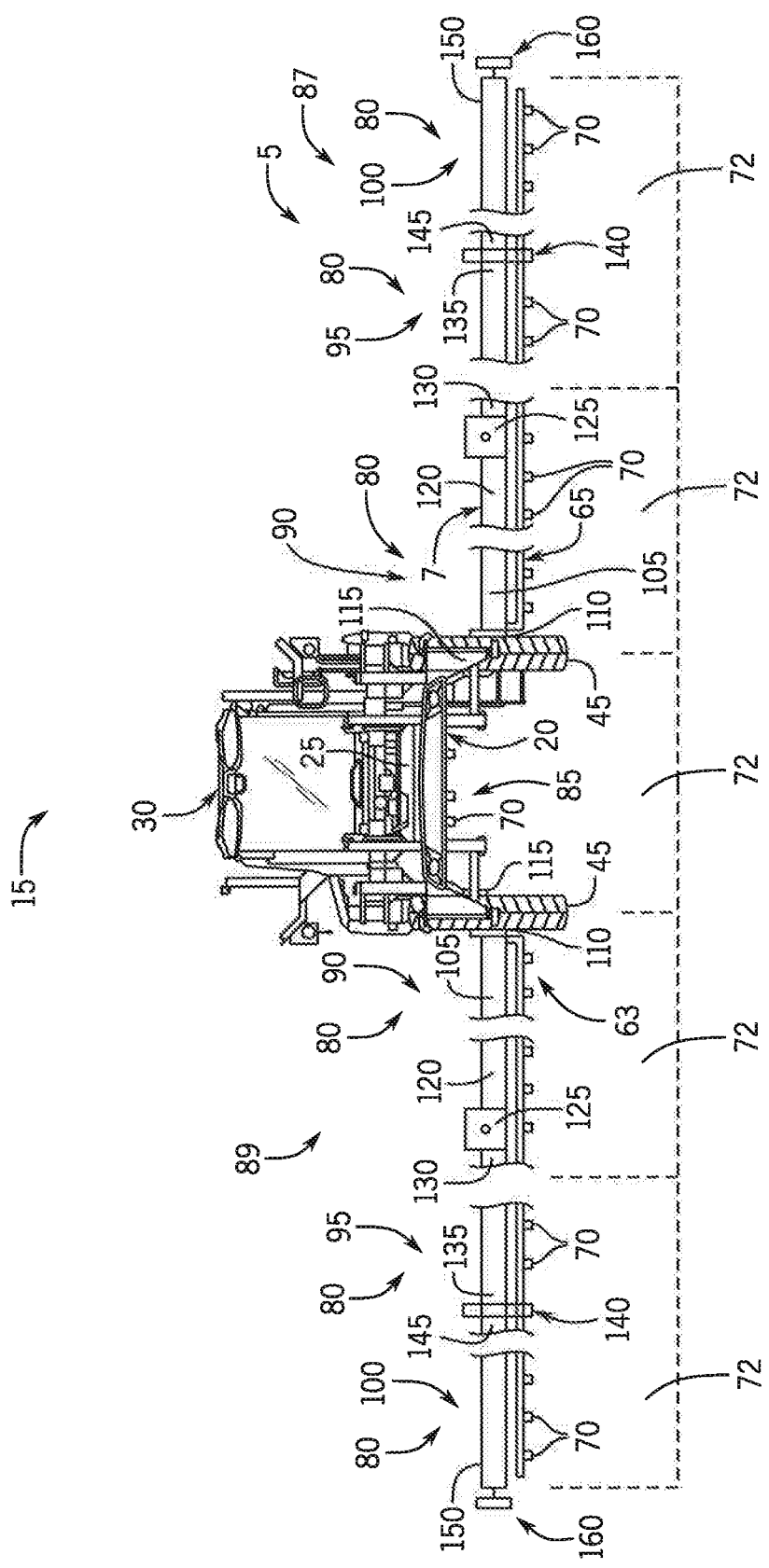
FIG. 2 is a front elevation of the agricultural machine of FIG. 1.

With additional reference to FIG. 2, the boom 17 can include multiple boom segments 80 connected longitudinally to provide the corresponding width of the assembled boom 17. Boom segments 80 include a center section 85 and left and right boom arms 87, 89 extending in opposite directions from center section 85. The left and right boom arms 87, 89 have multiple segments with pairs of primary boom segments 90, secondary boom segments 95, and breakaway boom segments 100 extending in opposite directions along the respective left and right boom arms 87, 89, mirrored about a longitudinal axis of the sprayer IS. The corresponding left and right segments of the pairs of primary, secondary, and breakaway boom segments 90, 95, 100 are substantially identical, so only one will be described, with the description applying to both the left and right segments of left and right boom arms 87, 89. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding the boom 17 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward to primary boom segment 90. Secondary boom segment 95 extends from secondary boom inner end 130 away from primary boom segment 90 to secondary boom outer end 135. Breakaway, joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored position of boom 17, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15.

In addition, one or more boom sensors 160 can be arranged at various positions along the boom 17. The boom sensors 160 can provide feedback to a boom control module 410, as will be further described herein, for monitoring boom height, a relative distance between the boom 17 and the field or plants below the spray boom 17. In an automatic boom height control mode, the boom control module 410 can electronically control one or more actuators 430 to maintain a predetermined boom height set point, such as 36 inches between the boom 17 and the field or plants below.

Figure 3:
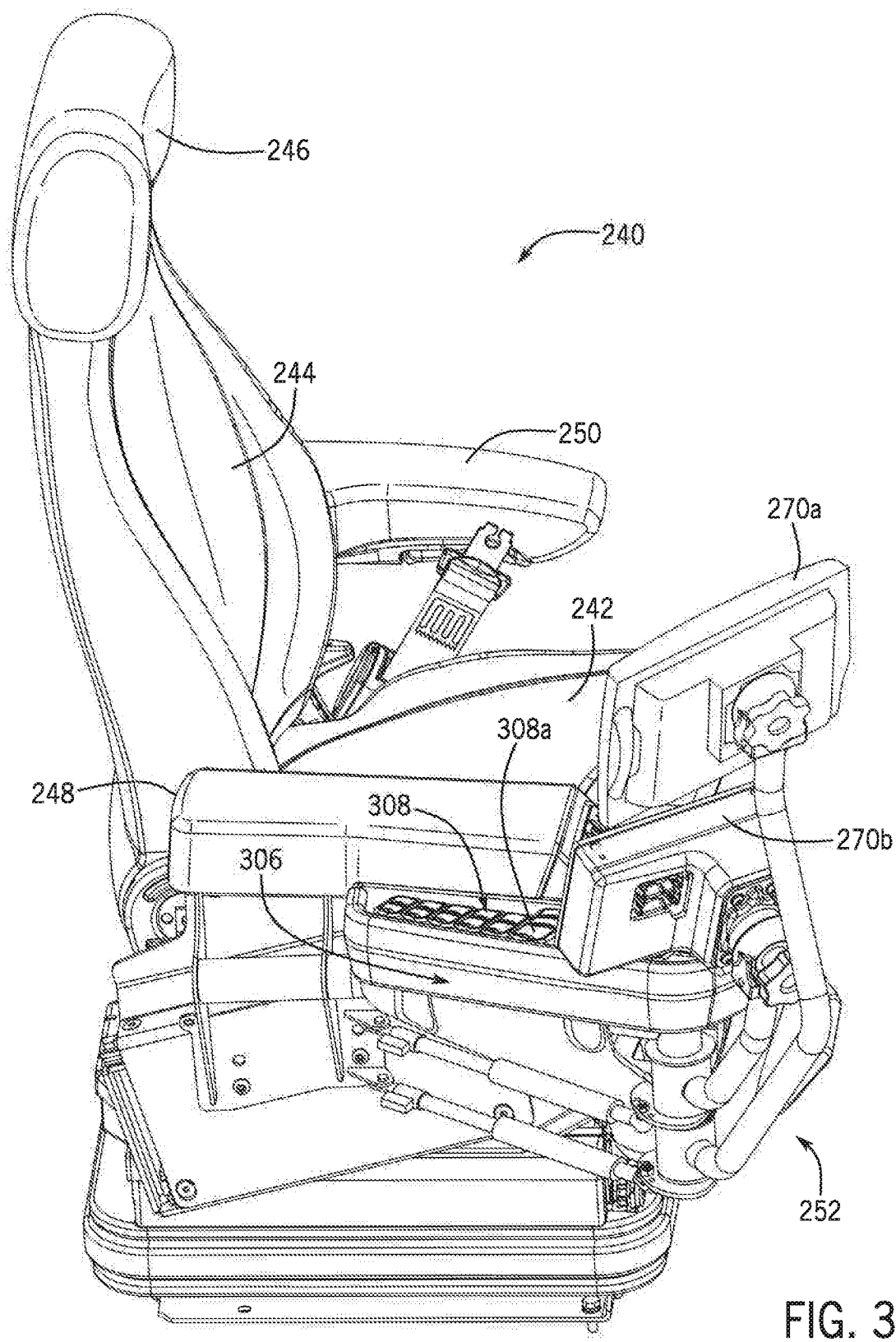
FIG. 3 is an isometric view of an armchair having an armrest configured with an armrest control center for a spray boom control system according to an aspect of the invention.

Referring now to FIG. 3, in the cab 30, a chair 240 is provided for use by an operator of the sprayer 15. The chair 240 can include a seat 242, a backrest 244 connected to the seat 242, a headrest 246 connected to the backrest 244, and first and second armrests 248 and 250, respectively, connected to portions of the seat 242 and the backrest 244 on opposing sides. The chair 240 can be electrically/mechanically adjustable by the operator to achieve a desired position for optimum driving conditions, such as moving or tilting forward, backward or laterally.

Figure 4:
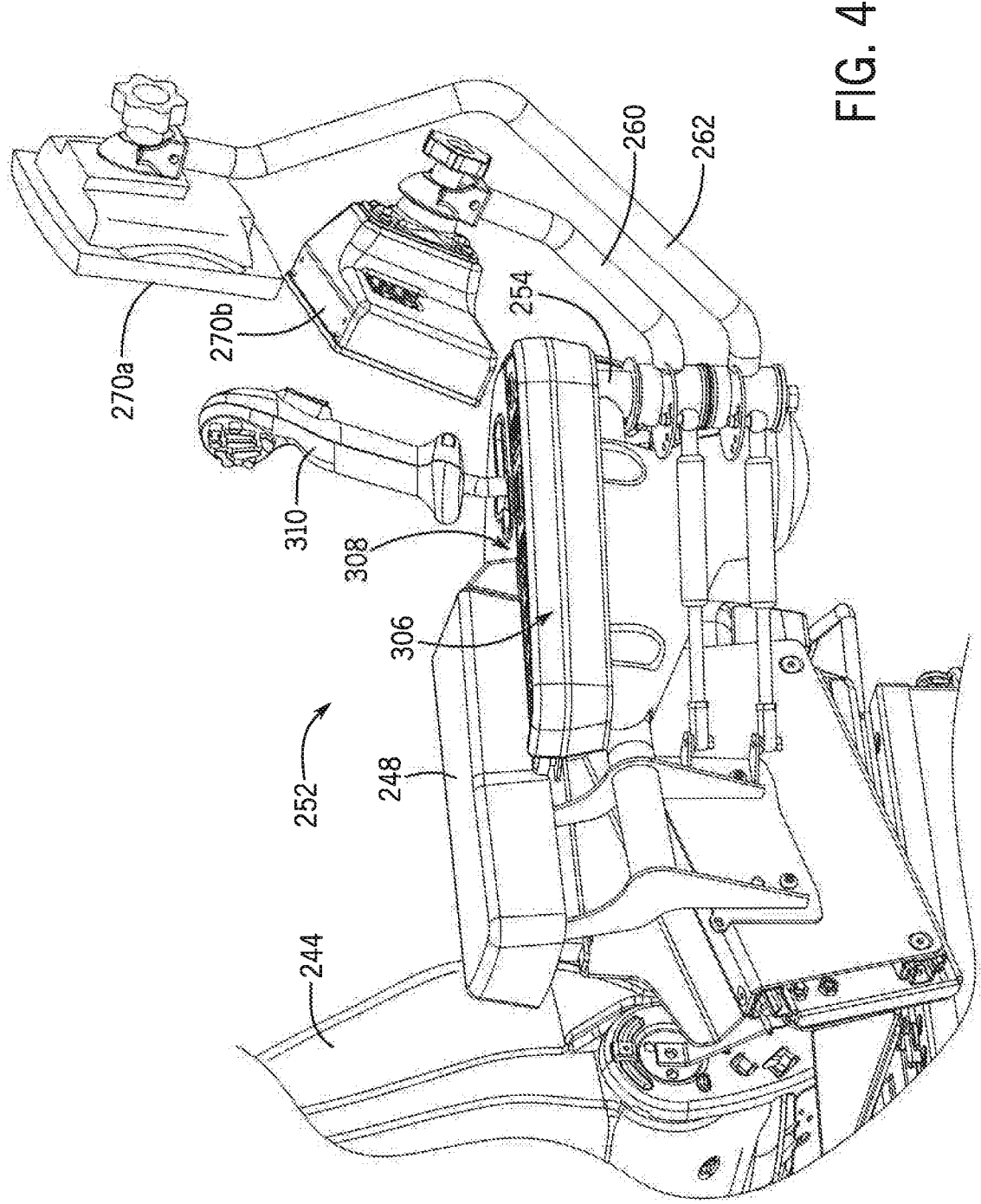
FIG. 4 is a detailed view of the armrest of FIG. 3.

With additional reference to FIG. 4, in one aspect, the first armrest 248 can be enhanced to be part of an armrest system 252. In particular, in the armrest system 252, the first armrest 248 can connect to a support attachment 254. The support attachment 254 can include a frame member extending longitudinally along a side of the chair 240 with multiple connecting brackets for connecting to the first armrest 248. In addition, the support attachment 254 can include a knuckle or other receiver at a forward position with respect to the chair 240, which can be threaded for joining first and second arms 260 and 262, respectively. The first and second arms 260 and 262, respectively, can each provide support assemblies for holding a Virtual Terminal (VT) screen 270, such as a first screen 270a held by a support assembly of the first arm 260, and a second screen 270b held by a assembly of the second arm 262. The armrest system 252 also includes an armrest control center 306 coupled to the armrest 248. The armrest control center 306 can include multiple operator controlled physical inputs, such as an instrument panel with push buttons 308, and/or a joystick 310 (or grip) which may pivot or otherwise move along a base and which may also include buttons, for allowing an operator to control various aspects the sprayer 15 by pressing buttons and/or moving a joystick.

Figure 5:
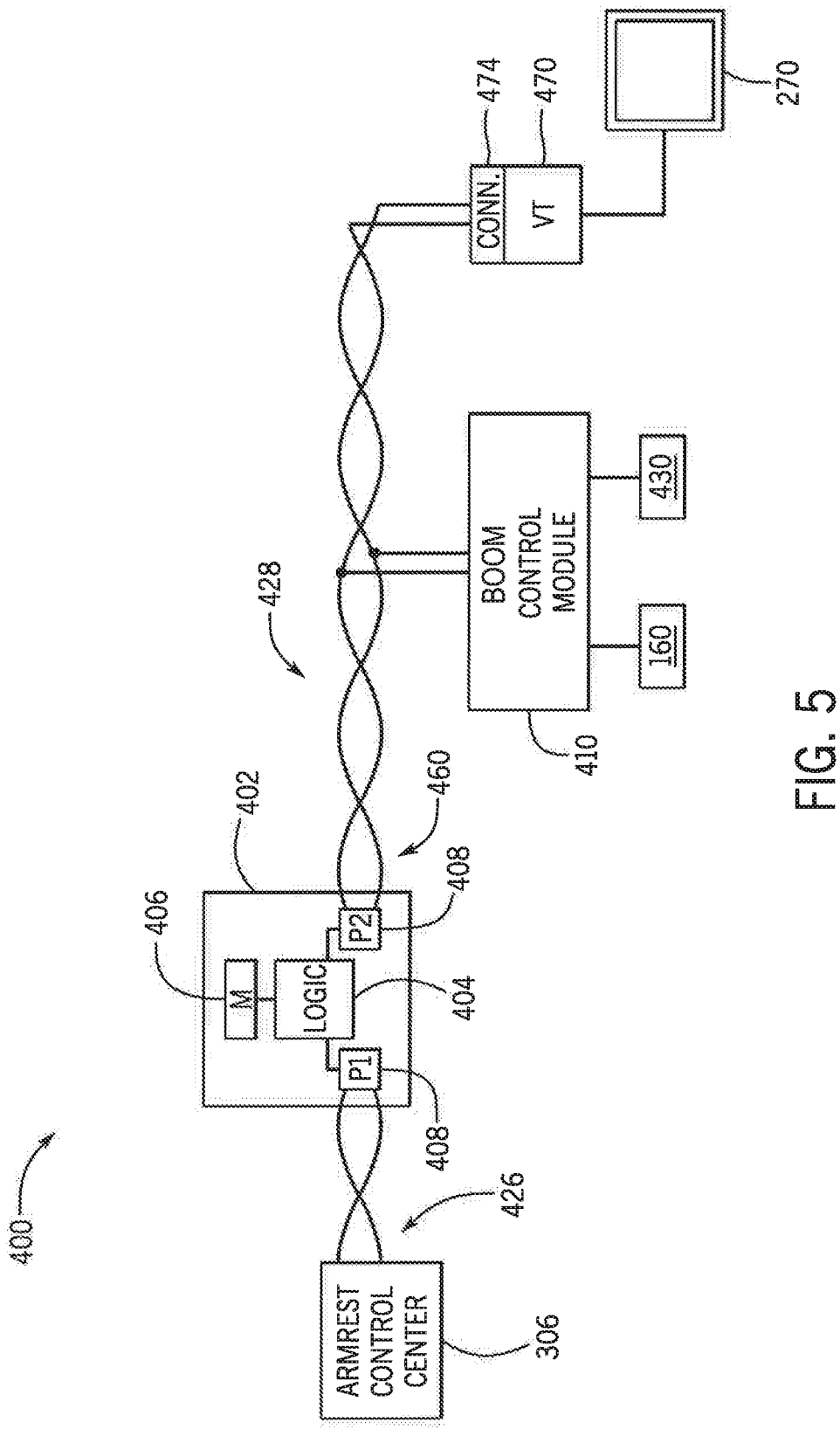
FIG. 5 is a simplified schematic of the spray boom control system for the machine of FIG. 1 according to an aspect of the invention.

Referring now to FIG. 5, a simplified schematic of a spray boom control system 400 for the sprayer 15 is provided in accordance with the present invention. The system 400 includes a machine controller 402 which may comprise logic or processing element 404, such as a processor or microcontroller, a memory 406 and multiple ports 408, such as ports "P1" and "P2." Each of the ports 408 can be electrically and logically configured to communicate according to one of various Controller Area Network (CAN) bus interface protocols, including for example Society of Automotive Engineers (SAE) 31939, International Organization for Standardization (ISO) 11783 (ISOBUS), ISO 11898, and the like, whose specifications are published and whose protocols are used broadly by a number of manufacturers and suppliers, including CNH Industrial. Accordingly, each of the ports 408 can receive inbound commands from and send outbound instructions to one or more devices connected to the respective port.

In the system 400, one or more electronic control modules can be connected to the machine controller 402 through the ports 208. The electronic control modules can provide a variety of information to an operator in the cab 30 and can receive commands from the operator for affecting various functions with respect to the sprayer 15. One such electronic control module may be the armrest control center 306 connected to the port P1. Accordingly, through the armrest control center 306, an operator can manipulate the buttons 308 and/or the joystick 310 to provide input to the machine controller 402 to affect various functions of the sprayer 15, such as ignition on/off, engine start/stop, speed control, activation/deactivation of lights, wipers and/or spray sections along the boom 17, raising/lowering the boom 17, tilting the boom 17, and the like. While the buttons 308 may provide commands to the port upon being pressed, the joystick 310 may also provide commands to the port according to angles and/or directions of control to the port. The armrest control center 306 may be connected to the port P1 through a first data communications bus 426 or path, which could be a CAN bus implementing SAE J1939 via twisted pair cabling. It should be appreciated that in alternative aspects, the buttons 308 and/or the joystick 310 could be sub-divided into separate electronic control modules for connections to separate ports within the scope of the invention.

Another electronic control module may be a boom control module 410 connected to the port P2. The boom control module 410 can receive inputs from the one or more boom sensors 160 for monitoring boom height. The boom control module 410 can also provide various outputs to one or more electronically controlled actuators 430, including for automatically adjusting boom height (to ensure the sprayer boom 17 is spaced far enough from the field or plants to avoid contact) based on received inputs from the one or more boom sensors 160, activating/deactivating such automatic boom height control, automatically controlling boom folding (such as at the boom hinges 110, 125) upon command by an operator, and the like. The boom control module 410 may be connected to the port P1 through a second data communications bus 428 or path which could also be a CAN bus implementing SAE J1939 via twisted pair cabling.

Another electronic control module may be a Virtual Terminal (VT) or field computer 470. The field computer 470 can also be connected to the port P2. The field computer 470 can connect to the port P2 through a connector 474 to the second data communications bus 428. The field computer 470 could be a mobile computing system configured to provide a Graphical User Interface (GUI) to the screen 270, which could be a touchscreen, for executing various farming related functions with respect to the sprayer 15. The field computer 470 could be, for example, an Advanced Farming Systems Pro 700 as available from CNH Industrial. Accordingly, an operator in the cab 30 may use the field computer 470 to display functions of the agricultural machine as controlled by electronic control modules including boom control module 410. For example, an operator could navigate through menus and screens of the field computer 470 to make changes through the boom control module 410, such as adjusting the boom height set point for automatic boom height control, activating/deactivating automatic boom folding, and the like.

The processing element 404 of the machine controller 402 can execute a program stored in the memory 406, which could be a Random Access Memory (RAM), Flash memory, Read Only Memory (ROM), or other non-transient medium, to receive commands from the armrest control center 306 relating to functions of the sprayer 15, and instruct a corresponding electronic control module to complete the commands with respect to the functions. In particular, commands from the armrest control center 306 could be sent by the operator from: a first button 308a for activating/deactivating automatic boom control; an upper portion of a second button 308b for increasing boom height when held (for when automatic boom control is activated); a lower portion of the second button 308b for decreasing boom height when held (for when automatic boom control is activated); an upper portion of a third button 308c to unfold one or more portions the left boom arm 87 (such as at the boom hinges 110, 125) of the boom 17 when held; a lower portion of the third button 308c to fold the one or more portions the left boom arm 87 when held; an upper portion of a fourth button 308d to unfold one or more portions the right boom arm 89 (such as at the boom hinges 110, 125) of the boom 17 when held; and a lower portion of the fourth button 308d to fold the one or more portions the right boom arm 89 when held. It should be appreciated that in alternative the buttons 308 and/or joystick 310 can be configured to send the same commands and/or additional commands in other arrangements. The processing element 404, in turn, can execute to route the commands from the armrest control center 306 to the boom control module 410 and the actuators 430 for completion of the task. Such routing may include translating, packaging and/or addressing as may be required by the first and second data communications buses 426 and 428, respectively. Accordingly, by providing the armrest control center 306 and the boom control module 410 as nodes on data communications buses coupled to the machine controller 402, an operator can advantageously control various functions of the boom 17 while operating the sprayer 15 without being required to navigate through menus and screens of the field computer 470 and the screen 270.

In addition, the processing element 404 can reference a data structure stored in the memory 406 for routing the commands from the armrest control center 306 to the boom control module 410. The data structure can relate the commands, for example, from a first communications protocols implemented by the first data communications bus 426, to a second communications protocols implemented by the second data communications bus 428. The processing element 404 can route the commands by translating, packaging and/or addressing the commands as may be required, as indicated by the data structure from the armrest control center 306 directly to the boom control module 410, bypassing the field computer 470 and the screen 270.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A spray boom control system for an agricultural machine, comprising:
    a boom control module configured to receive an input from a boom sensor indicating a relative distance between a spray boom and a field or plants below the spray boom and to provide an output signal in response thereto;
    an actuator operatively connected to the boom control module for receiving the output signal therefrom, the actuator adjusting the relative distance between the spray boom and the field or plants below the spray boom to a boom height set point in response to the output signal when a boom height control is activated, the boom control module being connected to a data communications bus;
    an armrest control center comprising an instrument panel providing a plurality of physical inputs configured to receive commands from an operator of the agricultural machine, wherein a first input of the plurality of inputs corresponds to activating or deactivating the boom height control; and
    a machine controller in communication with the boom control module through the data communications bus and the armrest control center, the machine controller having a processor executing a program stored in a non-transient medium to:
    receive a command from the first input for activating or deactivating the boom height control and route the command to the boom control module to activate or deactivate the boom height control, respectively.

2. The spray boom control system of claim 1, wherein a second input of the plurality of inputs corresponds to adjusting the relative distance, and wherein the machine controller further executes to receive a command from the second input for adjusting the relative distance by changing the boom height set point and route the command to the boom control module to change the boom height set point.

3. The spray boom control system of claim 1, wherein a second input of the plurality of inputs corresponds to folding or unfolding the spray boom, and wherein the machine controller further executes to receive a command from the second input for folding or unfolding the spray boom and route the command to the boom control module to fold or unfold the spray boom, respectively.

4. The spray boom control system of claim 1, wherein the instrument panel comprises a plurality of push buttons and a joystick.

5. The spray boom control system of claim 4, wherein the plurality of physical inputs corresponds to the plurality of push buttons.

6. The spray boom control system of claim 4, wherein the first input is provided by the joystick.

7. The spray boom control system of claim 1, wherein the machine controller further executes to route the command to the boom control module by translating the command from a first communications protocol to a second communications protocol.

8. The spray boom control system of claim 1, wherein data communications bus is an ISO 11898 Controller Area Network (CAN) bus and the boom control module is a node on the CAN bus.

9. The spray boom control system of claim 1, wherein the armrest control center is physically connected to a chair.

10. A spray boom control system for an agricultural machine, comprising:
- a boom control module configured to receive an input from a boom sensor indicating a relative distance between a spray boom and a field or plants below the spray boom and provide an output;
- an actuator operatively connected to the boom control module for receiving the output therefrom, the actuator adjusting the relative distance between the spray boom and the field or plants below the spray boom according to a boom height set point in response to the output, the boom control module being connected to a data communications bus;
- an armrest control center comprising an instrument panel providing a plurality of physical inputs configured to receive commands from an operator of the agricultural machine, wherein a first input of the plurality of inputs corresponds to adjusting the relative distance; and
- a machine controller in communication with the boom control module through the data communications bus and the armrest control center, the machine controller having a processor executing a program stored in a non-transient medium to:
- receive a command from the first input for adjusting the relative distance by changing the boom height set point and route the command to the boom control module to change the boom height set point.

11. The spray boom control system of claim 10, wherein a second input of the plurality of inputs corresponds to activating or deactivating a boom height control, and wherein the machine controller further executes to receive a command from the first input for activating or deactivating the boom height control and route the command to the boom control module to activate or deactivate the boom height control, respectively.

12. The spray boom control system of claim 10, wherein a second input of the plurality of inputs corresponds to folding or unfolding the spray boom, and wherein the machine controller further executes to receive a command from the second input for folding or unfolding the spray boom and route the command to the boom control module to fold or unfold the spray boom, respectively.

13. The spray boom control system of claim 10, wherein the instrument panel comprises a plurality of push buttons and a joystick.

14. The spray boom control system of claim 10, wherein the machine controller further executes to route the command to the boom control module by translating the command from a first communications protocol to a second communications protocol.

15. The spray boom control system of claim 10, wherein the armrest control center is physically connected to a chair.

16. An agricultural sprayer comprising:
- a sprayer boom extending transversely relative to a chassis, the sprayer boom including a plurality of boom sensors for indicating a relative distance between a spray boom and a field or plants below the spray boom and a plurality of actuators for controlling the relative distance according to a boom height set point when a boom height control is activated;
- an operator cab supported by the chassis, the operator cab including a chair physically connected to an armrest control center comprising an instrument panel providing a plurality of physical inputs configured to receive commands from an operator of the agricultural machine, wherein a first input of the plurality of inputs corresponds to activating or deactivating the boom height control;
- a boom control module configured to receive inputs from the plurality of boom sensors and provide outputs to the plurality of actuators, the plurality of actuators adjusting the relative distance between the spray boom and the field or plants below the spray boom according to the boom height set point in response to the outputs when the boom height control is activated, the boom control module being connected to a data communications bus; and
- a machine controller in communication with the boom control module through the data communications bus and the armrest control center, the machine controller having a processor executing a program stored in a non-transient medium to:
- receive a command from the first input for activating or deactivating the boom height control and route the command to the boom control module to activate or deactivate the boom height control, respectively.

17. The sprayer of claim 16, wherein a second input of the plurality of inputs corresponds to adjusting the relative distance, and wherein the machine controller further executes to receive a command from the second input for adjusting the relative distance by changing the boom height set point and route the command to the boom control module to change the boom height set point.

18. The sprayer of claim 16, wherein a second input of the plurality of inputs corresponds to folding or unfolding the spray boom, and wherein the machine controller further executes to receive a command from the second input for folding or unfolding the spray boom and route the command to the boom control module to fold or unfold the spray boom.

19. The sprayer of claim 16, wherein the machine controller further executes to route the command to the boom control module by translating the command from a first communications protocol to a second communications protocol.

20. The sprayer of claim 16, wherein the instrument panel comprises a plurality of push buttons and a joystick.

* * * * *